G. W. LIBBY & J. S. SCOTT.
HIGH SPEED ATTACHMENT FOR LATHES.
APPLICATION FILED SEPT. 4, 1908.

917,468.

Patented Apr. 6, 1909.
2 SHEETS—SHEET 1.

WITNESSES:
Fisher H. Pearson
Thomas J. O'Donnell

INVENTORS:
George W. Libby
John S. Scott
BY Gardner W. Pearson
their ATTORNEY.

G. W. LIBBY & J. S. SCOTT.
HIGH SPEED ATTACHMENT FOR LATHES.
APPLICATION FILED SEPT. 4, 1908.

917,468.

Patented Apr. 6, 1909.
2 SHEETS—SHEET 2.

WITNESSES:

INVENTORS
George W. Libby
John S. Scott
BY
Gardner W. Pearson
their ATTORNEY.

UNITED STATES PATENT OFFICE.

GEORGE W. LIBBY AND JOHN S. SCOTT, OF LOWELL, MASSACHUSETTS.

HIGH-SPEED ATTACHMENT FOR LATHES.

No. 917,468.  Specification of Letters Patent.  Patented April 6, 1909.

Application filed September 4, 1908. Serial No. 451,696.

*To all whom it may concern:*

Be it known that we, GEORGE W. LIBBY, a citizen of Canada, and JOHN S. SCOTT, a citizen of the United States, both residing at Lowell, in the county of Middlesex and State of Massachusetts, have invented certain new and useful Improvements in High-Speed Attachments for Lathes, of which the following is a specification.

Our invention relates to lathes and particularly to that class of lathes known as "turret lathes." In this class of lathes, the turret which holds different tools revolves upon a vertical axis. This class of lathes is largely used in connection with automatic feed and turret rotating devices thereby constituting what is known as an automatic lathe. It is also much used without such automatic attachments.

The object of our invention is to provide a high speed attachment in connection with the turret of such a lathe and certain of the tools carried thereby, whereby, without changing the speed of the chuck or spindle, such tools may be operated at a high rate of speed to perform certain operations such as drilling the center of pulleys and for many other purposes.

Our device is so arranged that as the desired face of the turret is turned to face the chuck, suitable gears are carried around and meshed with a gear carried by a turret counter shaft. After the turret begins to advance, a belt or other transmission means is thrown in place, whereat a high speed is communicated to the turret counter shaft and by it to the tool which is in operative position. As the gears mesh at a time when they are not revolving, there is no striking or pounding of the teeth or other parts to cause undue wear. Moreover, by the use of a belt shifted from a loose to a fast pulley, we get an elastic start for the tool whereby also undue wear is avoided. This is an advantage over a positive gear or clutch connection.

Figure 1:
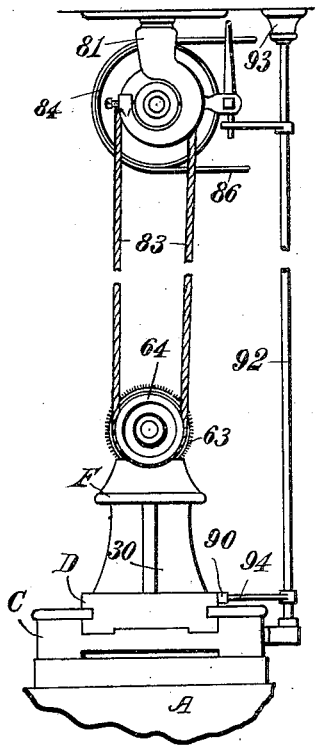
Figure 2:
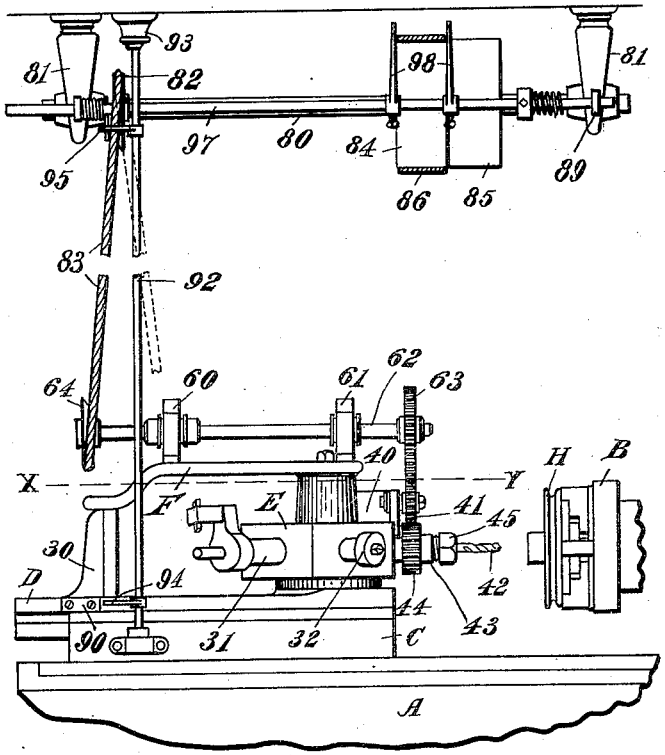
Figure 3:
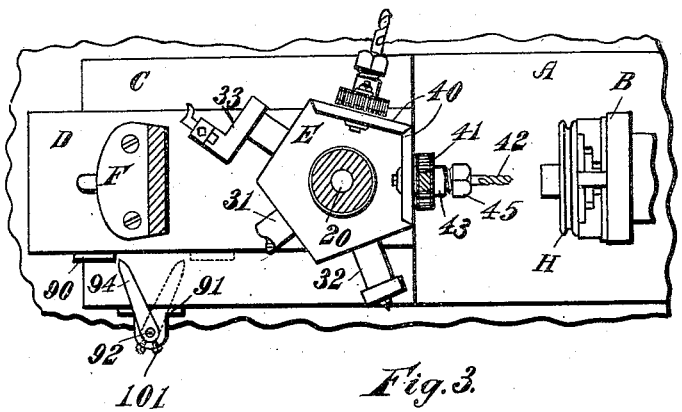
Figure 4:
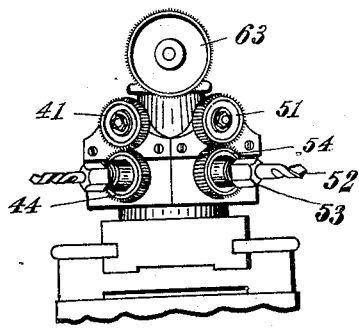
Figure 5:
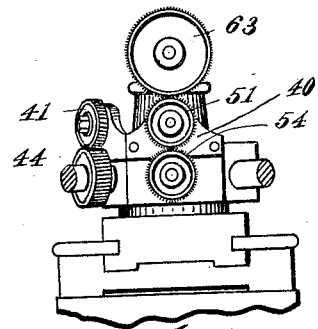
Figure 6:
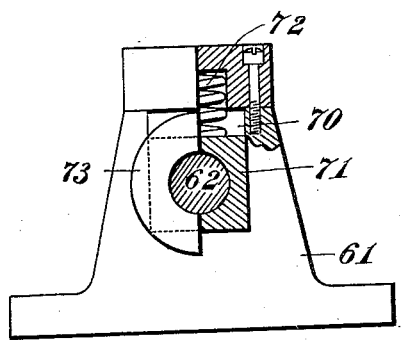
Figure 6:
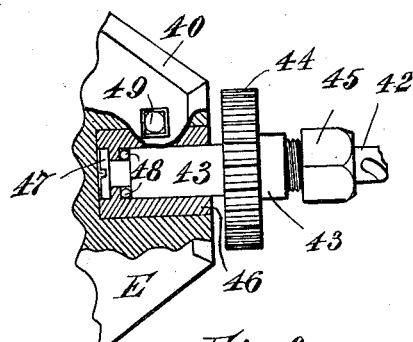
Figure 7:
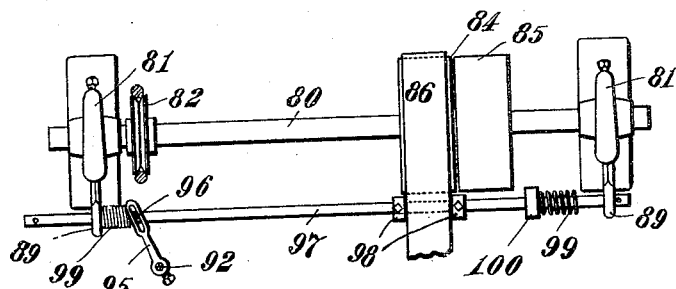

Figure 1 is a view from the side of the lathe from behind the turret and the slide. Fig. 2 is a view of a portion of the lathe from the back showing the turret, turret slide, chuck and counter shafting. Fig. 3 is a view from the top on line X Y of Fig. 2. Fig. 4 is a detail of the turret showing the high speed gears as they are about to mesh with the turret counter shaft gear. Fig. 5 shows one set of the high speed gears meshed with the turret counter shaft gear. Fig. 6 is a detail of the elastic bearing for the turret counter shaft. Fig. 7 is a view from the bottom of the main counter shaft and belt shifter. Fig. 8 is a detail of the tool holder and means of attaching it to the turret.

A is the bed of the lathe.
B is the chuck or spindle.
C is the turret slide block and D is the turret slide which supports the turret E and is arranged to be advanced toward and withdrawn from chuck B by hand or by automatic mechanism of any well known type.

H is a pulley or other casting to be operated on. The turret E is rotatable on a vertical axis and is carried by a spindle 20 carried by slide D and supported at the top by the over arm F which is supported from slide D by a bracket 30. This construction makes the bearing for turret E rigid and unyielding. The turret E may be rotated by hand or by machinery automatic or otherwise to bring its different faces successively opposite chuck B.

33, 31 and 32 represent tools of well known construction for use in turret lathes carried by different faces of turret E in any well known manner. In connection with one or more of the other faces we use our high speed attachment.

40 represents standards permanently fixed to the top of one or more of the faces of turret E and each of these standards carries a suitable shaft and loose intermediate gear as 41 or 51. The tool 42 which is shown as a drill is carried by a suitable tool holder 43 which also carries a gear 44 which meshes at all times when in place with gear 41. Tool holder 43 is carried by the face of turret E in the tool hole thereof. This gear 44 and tool holder 43 may be of any ordinary construction and may be attached to the face of the turret in any well known manner, but we prefer to make them as shown in Fig. 8.

Tool holder 43 carries a clamping nut or bonnet 45 by tightening which the tool 42 is held in place. It also carries gear 44 and fits into bushing 46 with a close running fit. It is held therein by a screw 47 and preferably bears against end thrust balls 48 which rest against a flange inside bushing 46 whereby friction is reduced. Bushing 46 fits closely in the tool hole of the turret and can be clamped into place by tightening bolt 49 in the same manner as is common with tool holders. It can be removed carrying with it, the tool holder, gear and tool by loosening bolt 49. The tool 52, tool holder 53, standard 40 and meshing gears 51 and 54 are of the same construction and arrangement on another face of turret E as those just described. The top of gears 41 and 51 should be lower than over arm F so that as the turret revolves they will not strike it.

On top of over arm F are stands 60 and 61 which carry turret counter shaft 62. At the inner end, turret counter shaft 62 carries a gear 63 at such a point and of such size that it will mesh with the loose intermediate gears 41 and 51 when they are respectively presented in operative position in front of chuck B. This action is shown in Figs. 4 and 5 where in Fig. 4, gear 41 is shown as having just left gear 63 and gear 51 as about to mesh therewith. Fig. 5 shows gear 51 as actually meshed. This turning of the turret in an automatic lathe, occurs at the extreme backward point when the turret is stationary so far as horizontal action is concerned.

The stand 61 is recessed at 70 to form a vertical channel in which box 71 can slide. Shaft 62 is carried by box 71 which is its bearing. A spring 72 normally keeps box 71 depressed to the position shown where shaft 62 is properly alined. A flange 73 and a similar flange on the other side of stand 61 both attached to box 71, keep box 71 in place. By the use of this elastic bearing, if gear 41 or 51, as it comes in place, does not strike the teeth of gear 63 at just the right place, gear 63 and shaft 62 will be forced upward to a slight degree until the teeth mesh properly. The shaft bearing in stand 60 should be a trifle loose to permit this action. At its other end, shaft 62 carries a deeply grooved pulley 64. The main counter shaft 80 which is supported by suitable hangers 81, 81 carries a grooved pulley 82 which may be larger or smaller according to the speed desired. A round belt 83 passes around pulleys 82 and 64 whereby pulley 64 and shaft 62 and thereby tool 42 may be driven at a high rate of speed. This pulley 82 should be placed at such a point on shaft 80 that it will be midway between the extreme forward and backward points reached by pulley 64 as the turret travels back and forth as shown by the dotted lines in Fig. 2. The reason for this is to reduce the stretching of belt 83 to the minimum point. Pulleys 82 and 64 are preferably deeply grooved to prevent the belt 83 from slipping off. The position of pulley 64 is such, that the spring 72 may be omitted and the tension of belt 83 will keep shaft 62 down and gear 63 meshed with gear 41 or 51 and will yield sufficiently to allow them to swing into place. Shaft 80 carries a loose pulley 84 and a fast pulley 85, about which travels a belt 86 which transmits power from the main shaft.

Fixed to turret slide D is a block 90 and turret slide block C has fixed to it, a bearing 91 for vertical shipper shaft 92 which is also supported by the top bearing 93. Shaft 92 carries a finger 94 in such position that it will be struck by block 90 as slide D moves forward or back. In this way shaft 92 is partially rotated at every forward and at every backward passage of slide D. Near the top of shipper shaft 92 is fixed a slotted arm 95 through the slot of which passes a pin 96 which is driven through horizontal shipper rod 97. Shipper rod 97 is suitably supported in bearings 89 carried by hangers 81 and carries the usual belt shifting fingers 98, 98, whereby belt 86 is shifted from and to pulleys 84 and 85.

It will be seen that when the device is properly adjusted, as the turret and slide are withdrawn, block 90, acting on finger 94, will shift belt 86 from fast pulley 85 to loose pulley 84 whereby shaft 80 and the rest of the high speed mechanism will be stopped. When slide D advances, belt 60 will be shifted on to fast pulley 85 and the high speed mechanism will operate the tool which happens to be in use.

To insure finger 94 always being in the track of block 90, we prefer to use on shipper rod 97 the springs 99, 99 which bear between bearing 89 and collar 100 and bearing 89 and pin 96 whereby finger 94 cannot remain at either extreme point but will always be forced back enough to be in the path of block 90.

It is apparent that gears 41 and 51 will mesh with gear 63 at a time when that gear is not revolving and that after this occurs and after the turret has started to advance, belt 80 is thrown on to the fast pulley whereby the high speed is started. It is also apparent that by changing the size of pulleys 82 and 64, any desired speed may be obtained and it is clear that one face of turret E may be equipped with the high speed device or two faces or all faces. Bushing 46, tool holder 43, and gear 44 may be readily removed and an ordinary cutting tool may be put in place thereof if it is not desired to use the high speed.

When any of the faces of the turret carrying ordinary cutting tools without high speed gears are in operative position, the shipping device will act in the same way and will revolve turret counter shaft 62 and gear 63 in the same manner as if high speed tools were being operated, but this does no harm. In such case however, it is very easy to shift the belt 86 from the main shaft (not shown) or to loosen set screw 101 which binds finger 94 to shipper rod 92 and turn the finger 94 around out of the path of block 90 or raise it above the block. This throws off the high speed motion entirely.

What we claim as our invention and desire to cover by Letters Patent is:—

1. In a high speed attachment for lathes, a turret slide, a turret carried thereby, a plurality of high speed gears and tool holders in operative relation therewith carried by different faces of the turret, a turret counter shaft carried by the turret slide, a turret counter shaft gear carried by the turret counter shaft at such point and of such size as to mesh with the high speed gears carried by the turret, combined with means for revolving the turret counter shaft, and means operated by the turret slide for starting and stopping the means for revolving the turret counter shaft.

2. In a high speed attachment for lathes, a turret slide, a turret carried thereby, a plurality of high speed gears and tool holders in operative relation therewith carried by different faces of the turret, a turret counter shaft carried by the turret slide, a turret counter shaft gear carried by the turret counter shaft at such point and of such size as to mesh with the high speed gears carried by the turret, and a pulley carried by the turret counter shaft, combined with a counter shaft, a pulley and belt connection between said counter shaft and the turret counter shaft pulley, fast and loose pulleys carried by the counter shaft, a belt thereon, and a shipper for said belt operatively connected with the turret slide.

3. In a lathe, a turret slide, a turret, high speed gears and tool holders carried thereby, stands carried by the slide one of which carries a fixed bearing and the other carries an elastic bearing, a turret counter shaft carried by the stands, a gear on said turret counter shaft at such point and of such size as to mesh with said high speed gears, and means for revolving said counter shaft as described.

4. In a lathe, a turret slide, a fixed bearing and a yielding bearing carried thereby, a turret counter shaft carried by said bearings, a pulley on one end of said shaft, a gear on the other end of said shaft, and a driving belt which passes over said pulley, combined with a turret carried by the turret slide, and a plurality of tool holders and high speed gears carried by different faces of the turret in such position as to mesh with the turret counter shaft gear as the turret revolves.

In testimony whereof we affix our signatures in presence of two witnesses.

GEORGE W. LIBBY.
JOHN S. SCOTT.

Witnesses:
HAROLD J. PATTEN,
CHARLES J. DUFFY.